(12) United States Patent
Lee

(10) Patent No.: US 6,868,130 B2
(45) Date of Patent: Mar. 15, 2005

(54) TRANSMISSION MODE DETECTOR FOR DIGITAL RECEIVER

(75) Inventor: Tsung-Lin Lee, Hsin Chu County (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 750 days.

(21) Appl. No.: 09/840,987

(22) Filed: Apr. 25, 2001

(65) Prior Publication Data

US 2003/0021363 A1 Jan. 30, 2003

(51) Int. Cl.$^7$ .............................................. H04L 27/16
(52) U.S. Cl. ...................... 375/324; 375/340; 375/354; 370/503
(58) Field of Search ................................. 375/260, 316, 375/340, 324, 354, 362, 364, 368; 370/503, 504, 514, 520

(56) References Cited

U.S. PATENT DOCUMENTS 6,058,101 A * 5/2000 Huang et al. ............... 370/208
6,314,083 B1 * 11/2001 Kishimoto et al. .......... 370/210
6,381,251 B1 * 4/2002 Sano et al. .................. 370/480

* cited by examiner

Primary Examiner—Dac V. Ha
(74) Attorney, Agent, or Firm—Birch, Stewart, Kolasch & Birch, LLP

(57) ABSTRACT

A transmission mode detector for digital receiver is proposed. The transmission mode detector comprises a RF tuner for receiving RF signals and generating intermediate frequency (IF) signals. An envelope detector is employed to filter the IF signals and generate rough envelope signal and a hard-decision machine is employed to quantize the rough envelope signal into hard-decision binary signals. The transmission mode detector further comprises a glitch remover to remove the unwanted glitch in the binary signals and generate envelope signal. An A/D converter is used to quantize the IF signals and generate digital signal. Further more, an I/Q de-multiplexer is used to extract the in-phase and the quadrature terms of the OFDM symbol from the digital signal. The transmission mode detector then detects the transmission mode by a mode detect unit according to the period of the envelope signal. If the detected mode is mode II or III, then the mode detect unit further distinguishes the transmission mode based on the auto-correlations of the OFDM symbol.

8 Claims, 9 Drawing Sheets

TRANSMISSION MODE DETECTOR FOR DIGITAL RECEIVER

BACKGROUND OF THE INVENTION

1. Field of Invention

The invention relates to a transmission mode detector for digital receivers and, more particularly, to a transmission mode detector compliant with the ETS 300 401 standard.

2. Related Art

According to the ETS 300 401 standard, a transmission frame is consisted of a null symbol and several successive OFDM (Orthogonal Frequency Division Multiplex) symbols. A receiving system has to detect the presence of the null symbol first in order to verify the presence of broadcasting radio signals. The timing of the detected null symbol is also used as a synchronization signal. Furthermore, there are four transmission modes specified by ETS 300 401 for different broadcasting networks. For example, the transmission mode I is usually used in terrestrial broadcasting in urban areas, while signals broadcasted through satellites are typically in the transmission mode II or IV. TABLE 1 lists the system parameters of the four transmission modes.

TABLE 1

| Parameter | Mode I | Mode II | Mode III | Mode IV |
|---|---|---|---|---|
| L | 76 | 76 | 153 | 76 |
| K | 1536 | 384 | 192 | 768 |
| $T_F$ | 96 ms | 24 ms | 24 ms | 48 ms |
| $T_{NULL}$ | ~1.297 ms | ~324 $\mu$s | ~168 $\mu$s | ~648 $\mu$s |
| $T_S$ | ~1.246 ms | ~312 $\mu$s | ~156 $\mu$s | ~623 $\mu$s |
| $T_u$ | 1 ms | 250 $\mu$s | 125 $\mu$s | 500 $\mu$s |
| $T_{gi}$ | ~246 $\mu$s | ~62 $\mu$s | ~31 $\mu$s | ~123 $\mu$s |

The system parameters, such as the carrier number K in each OFDM symbol, the symbol number L in each transmission frame, the symbol duration $T_s$, and so on, are different in different modes. Since the receiving system cannot correctly decode the received data without the information of the transmission mode, the transmission mode must be first detected before the receiving system performs demodulation and decoding.

SUMMARY OF THE INVENTION

In view of the foregoing problem, the invention proposes a transmission mode detector that can quickly detect the transmission frames and has a simple structure.

To achieve the above object, the disclosed transmission mode detector includes: a RF tuner for receiving radio signal and generating IF (Intermediate Frequency) signals, an envelope detector for filtering out the IF signals and generating a rough envelope waveform, a slicer for quantizing the rough envelope waveform into high and low potentials and generating binary signals, an A/D converter for sampling and digitizing IF signals to give digital signals, an I/Q (In-phase/Quadrature) De-multiplexer for extracting in-phase and quadrature signals in the OFDM symbols from the digital signals, and a mode detection unit for determining the transmission mode of the transmission frame according to the envelope signal time period. If the transmission mode is the mode II or III, then it further detects the transmission mode using the auto-correlation among the OFDM symbols.

The envelope detector of the invention contains: a diode, whose positive terminal receives the IF signals, an RC network, whose one end connects to the negative terminal of the diode and the other end is grounded. The disclosed slicer is a comparator, whose positive terminal connects to the negative terminal of the diode and whose negative terminal connects to a reference voltage and generates an envelope waveform.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not imitative of the present invention, and wherein.

DETAILED DESCRIPTION OF THE INVENTION

Figure 1:
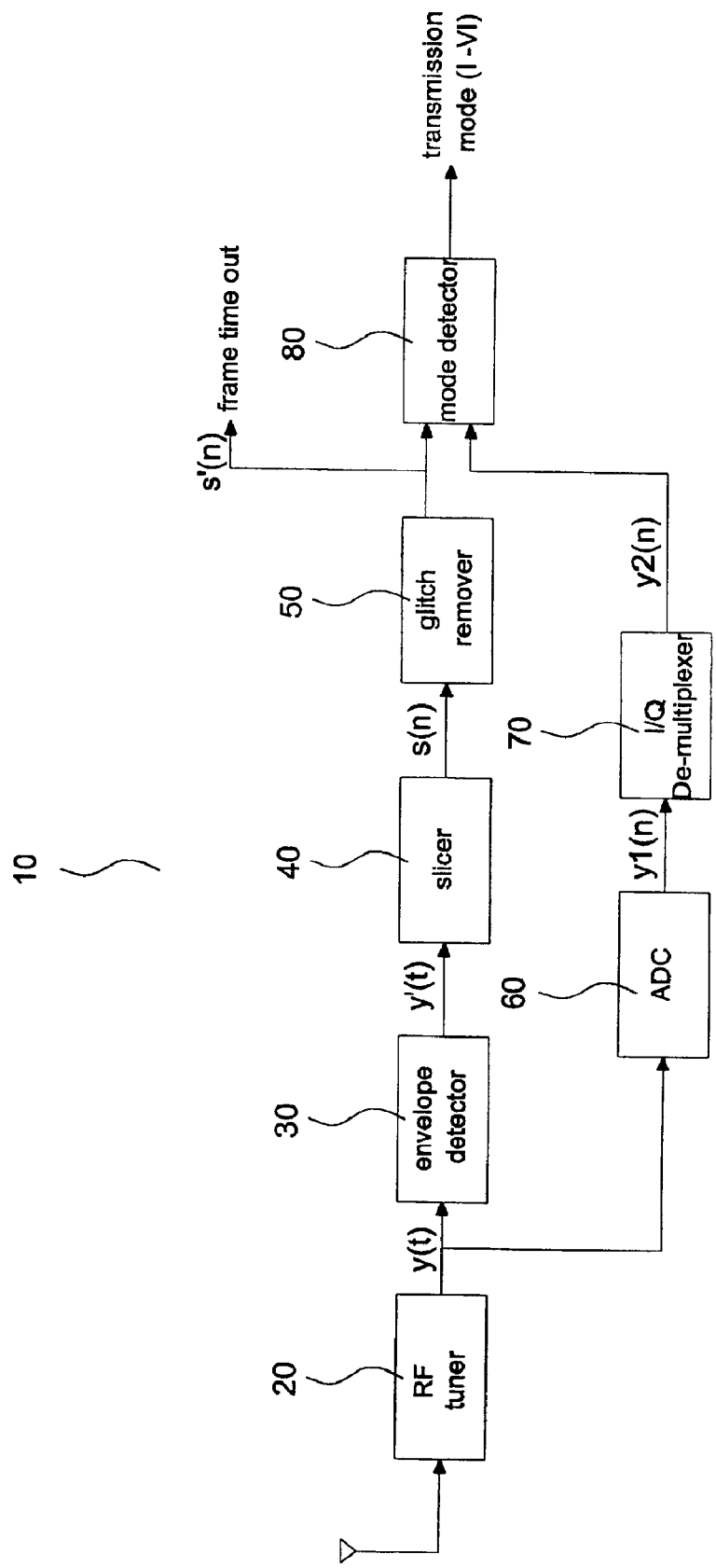
FIG. 1 shows a system block diagram of the disclosed transmission mode detector.

With reference to FIG. 1, the transmission mode detector 10 contains a RF tuner 20, an envelope detector 30, a slicer 40, a glitch remover 50, an A/D converter 60, an I/Q De-multiplexer 70 and a mode detector 80. The signals processed by the RF tuner 20, the envelope detector 30 and the glitch remover 40 are analogue signals. The signals processed by the A/D converter 60, the I/Q De-multiplexer 70 and the glitch remover 50 are digital signals.

Figure 6:
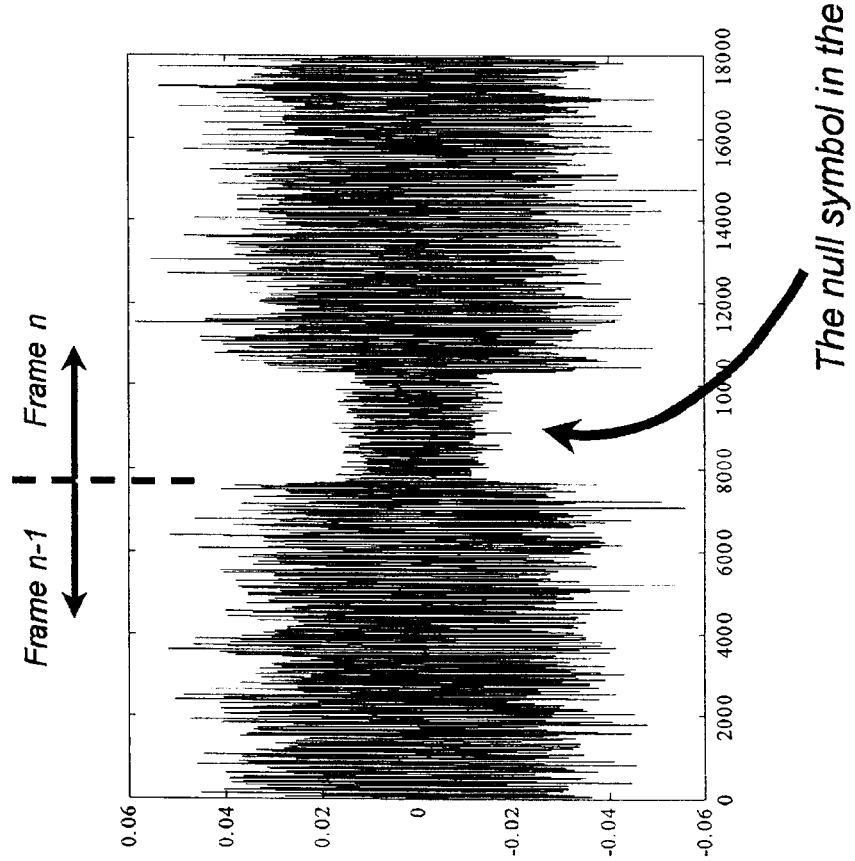
FIG. 6 shows a waveform example of the IF signal y(t).

As shown in FIG. 1, the RF tuner 20 receives a RF signal from an antenna and generates an IF signal y(t). An example is shown in FIG. 6. The IF signal y(t) is turned into an envelope waveform y'(t) by the envelope detector 30. The envelope waveform y'(t) is converted into a binary signal s(n), i.e. H and L, by the slicer 40. After the glitch remover 50 removes the glitches in the binary signal s(n), it is turned into a data envelope signal s'(n). At the same time, the IF signal y(t) is converted into a digital signal y1(n) by the A/D converter 60. In-phase and quadrature signals of y2(n) are extracted from the digital signal y1(*n*) by the I/Q De-multiplexer 70. Finally, the mode detection unit 80 determines the transmission mode according to the data envelope signal s'(n) and the I/Q signals.

Figure 2:
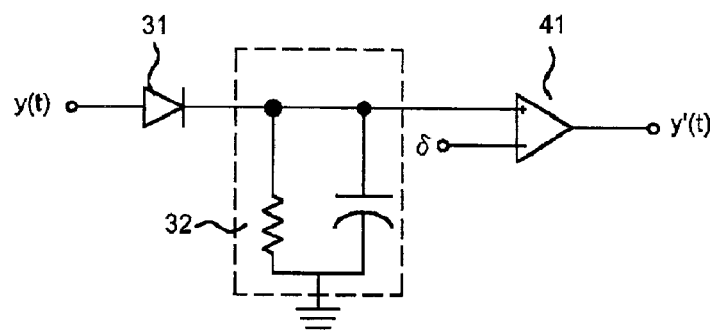
FIG. 2 shows an embodiment circuit of the envelope detector and the slicer in the invention.

As shown in FIG. 2, the envelope detector 30 contains a diode 31 and a RC network 32. The slicer 40 can be a comparator 41. The RC network 32 of the envelope detector 30 is equivalent to a low-pass filter. Since only signals with positive voltage values higher than the voltage drop of the diode, typically 0.6~0.7 volts, can pass through the diode 31, therefore the output terminal of the diode 31 gives the absolute valued waveform of the original signal. It should be noted that the null symbols to be detected have time periods of 96 ms (transmission mode I), 48 ms (transmission mode IV) and 24 ms (transmission modes II and III). Thus, the appearance frequency of the null symbols is much lower than that of the IF signals (typically in the range of several MHz). In addition, the null symbols have a long duration ranging from several hundred µs to several ms. Therefore, a low-pass filter can be used to extract the envelope of the null symbols and the envelope with a rapid changing rate is smoothed and filtered out. The 3 dB frequency $f_o$ of the low-pass filter used in the RC network 32 can be determined from the reciprocal of the time period of the null symbols. This RC value can be determined from the criterion $$\left(R \cdot C = \frac{1}{2\pi f_0}\right).$$

Figure 7:
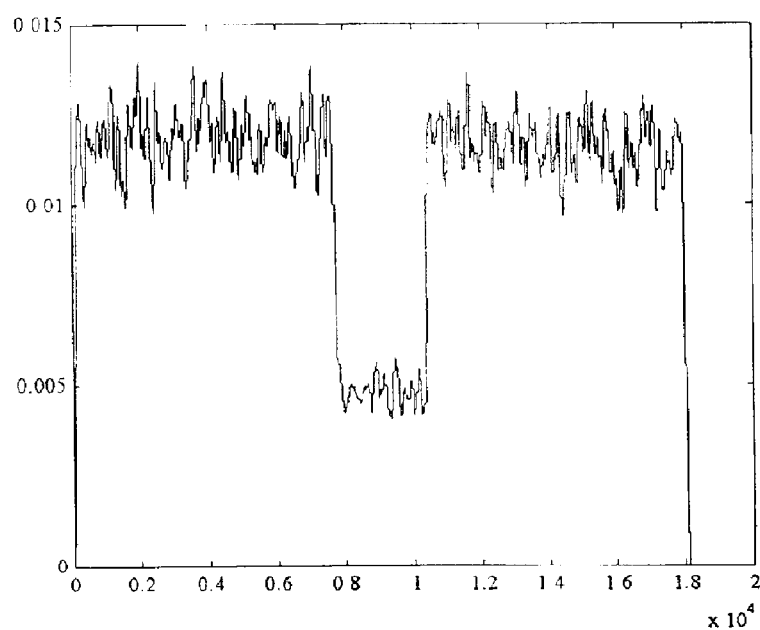
FIG. 7 shows an output envelope waveform y'(t) the envelope detector.

The filtered output waveform y'(t) from the envelope detector 30 is shown in FIG. 7.

Figure 8:
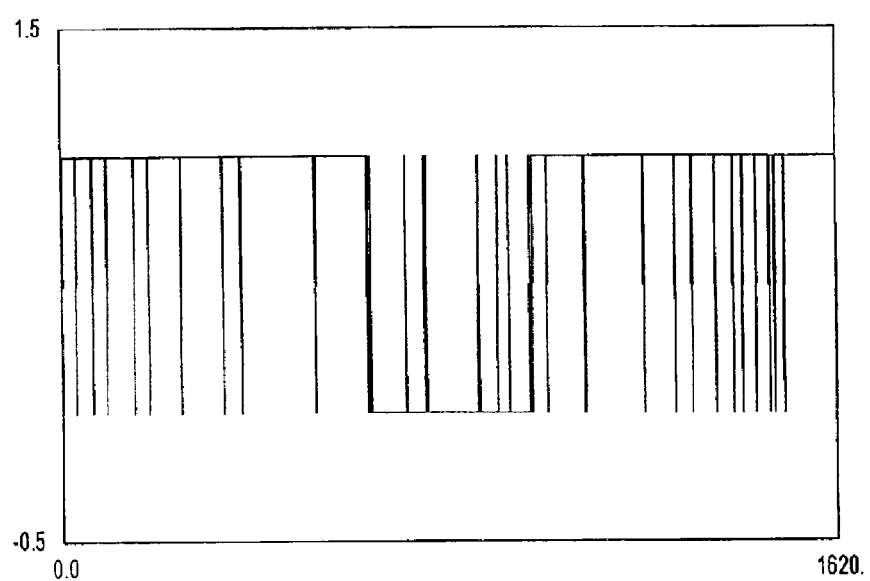
FIG. 8: shows the binary signal s(n) that pass through the slicer.

The smoothed envelope waveform signal y'(t) is now quantized into a hard-decision binary signal s(n), i.e., high (H) or low (L), by the slicer 40. As shown in FIG. 2, the slicer 40 can be a comparator 41. According to the thumb of rules, the threshold δ can be chosen as the half of the peak-to-peak voltage of the IF signal or a little higher. As shown in FIG. 8, there are some unnecessary glitches in the binary signal s(n) after the slicer 40. Such glitches show up in places with low (S/N) signal-to-noise ratios and have a higher probability to cause false detections of frame timing. Therefore, the invention uses a glitch remover 50 to remove the glitches to improve the detection performance.

Figure 9:
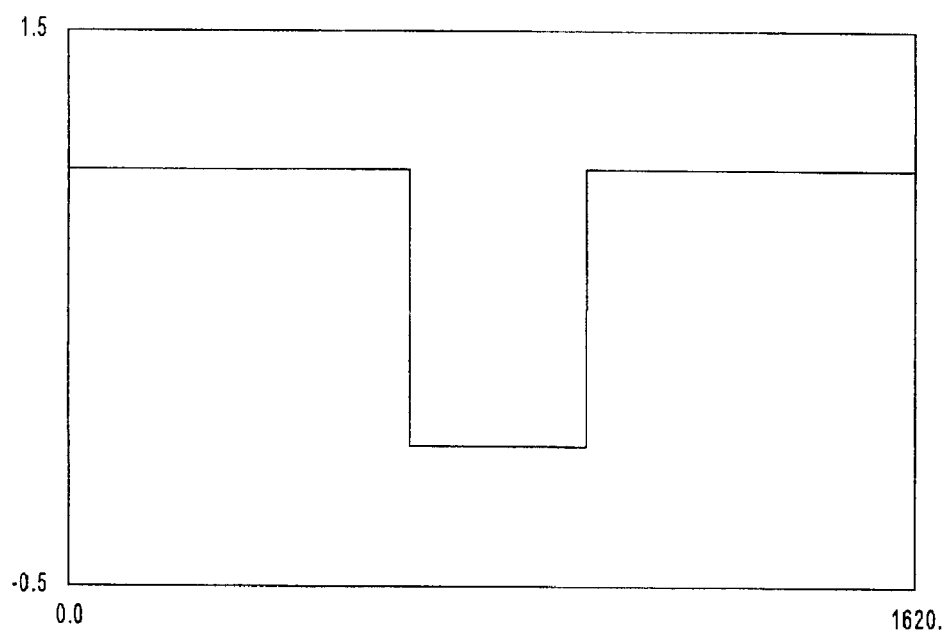
FIG. 9 shows the envelope signal s'(n) after glitch remover.
Figure 3:
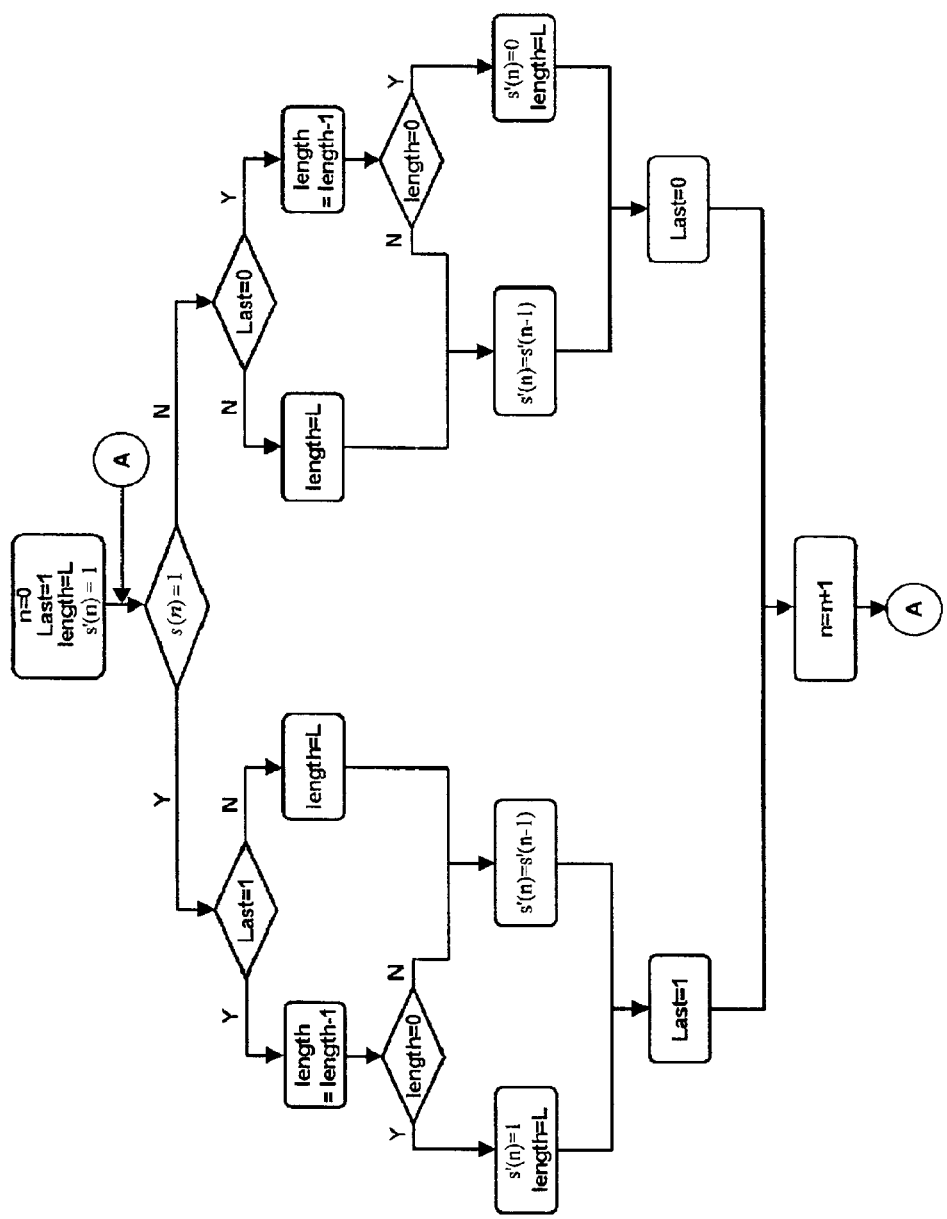
FIG. 3 shows a structure diagram of the glitch removal.

As shown in FIG. 3, the core concept in the glitch remover 50 is that only the s(n) with low levels in successive L samples is considered as a valid null symbol. In addition, transitions followed by samples of less than successive L specific levels (high or low) are removed and then smoothed. That is, glitches are considered as signals that cannot have successive L samples staying at the same level. In this way, the glitch remover 50 can easily remove almost all the unwanted glitches. Therefore, the final output signal of frame timing s'(n), detected from the glitch remover 50, becomes very clear and is free from any glitch. The envelope signal s'(n) can be used as the frame timing base for the digital receiving system. The detected envelope signal s'(n) output from the glitch remover 50 is shown in FIG. 9.

According to the specification of ETS 300 401, there are three physical transmission frame durations. The frame duration is 96 ms for transmission mode I, 48 ms for the mode IV, and 24 ms for both the modes II and III. Therefore, one can detect which transmission mode directly by calculating the period of the detected frame envelope signal s'(n).

Figure 4:
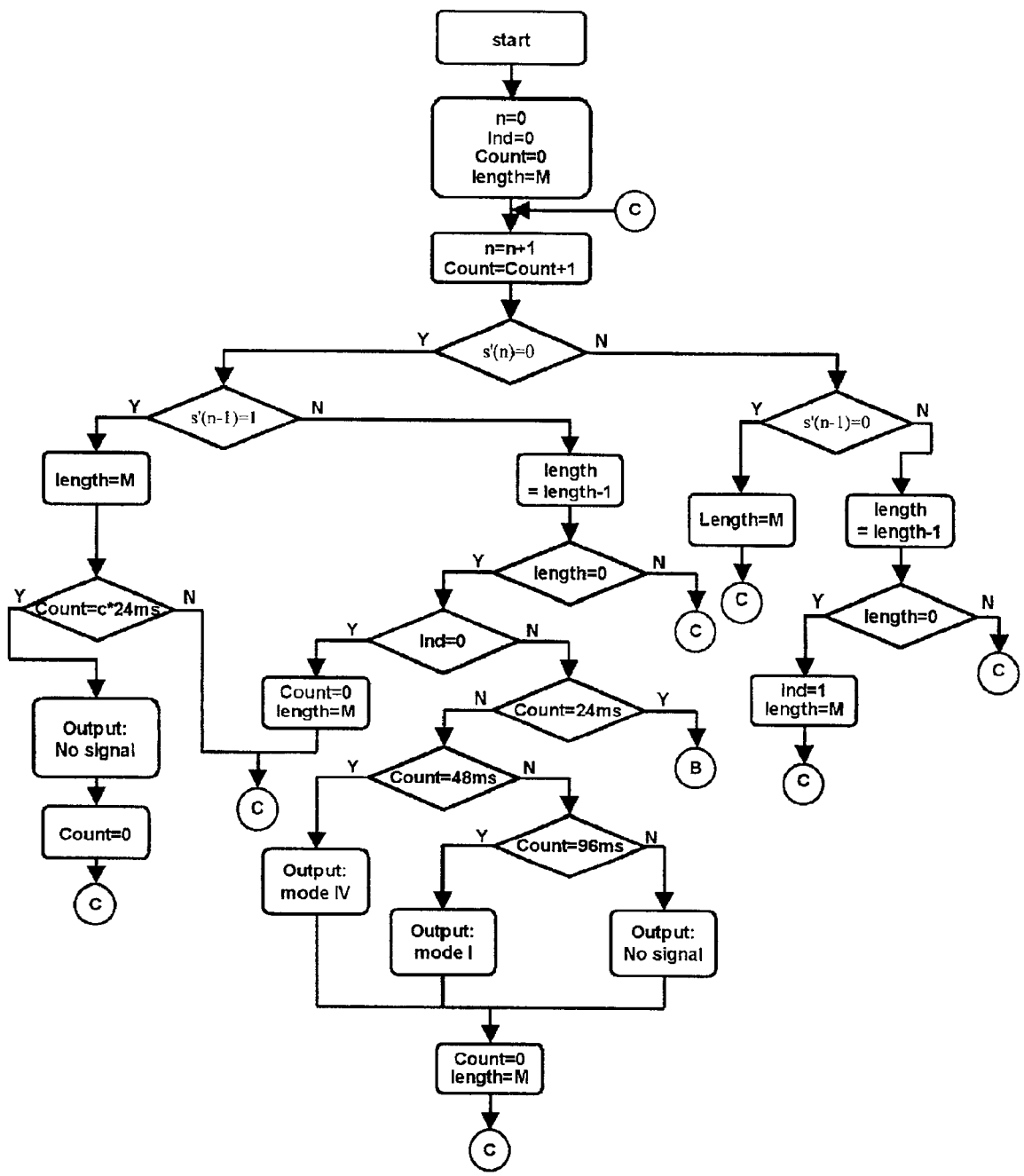
FIG. 4 shows a partial flowchart of the mode detection unit which uses the time period of the envelope signal for the mode detection.

The flowchart shown in FIG. 4 detects the transmission mode according to the envelope signal s'(n). The main technique in the procedure is to use a counter to compute the time period of each envelope signal s'(n). If the time period is found to be 24 ms, then the transmission mode is the mode II or III, which is further determined according to the method shown in FIG. 5. A received signal with a detected 48 ms-period transmission frame will be detected to be in the transmission mode IV. If the time period is 96 ms, then it is in the transmission mode I. If the time period of the received signal is other than 96 ms, 48 ms or 24 ms, the transmission frame is not considered as an effective signal. Furthermore, no null symbol being detected in a period of c*24 ms indicates that there is no effective signal received.

Since the transmission modes II and III use the same transmission frame duration (24 ms), the system needs to further distinguish the signal using some other method when a 24 ms-period signal is detected. With reference to the algorithm shown in FIG. 5, the auto-correlation of the received signal is calculated based using the parameters of the modes II and III. The one with a larger auto-correlation is selected as the detected transmission frame mode.

The received IF signal y(t) from the RF tuner 20 has the form of I(t) cos(2πf$_c$')−Q(t) sin(2πf$_c$') where f$_c$ is the central frequency of the incoming IF signal. After the IF signal y(t) is sampled and digitized by the A/D converter 60, the in-phase term I(t) and the quadrature term Q(t) are extracted separately for the following demodulator and the disclosed mode detection unit 80. It should be emphasized that neither the phase information for the sampling clock at the A/D converter, the carrier recovery for f$_c$, nor the precise symbol timing is required in the invention disclosed herein.

Figure 5:
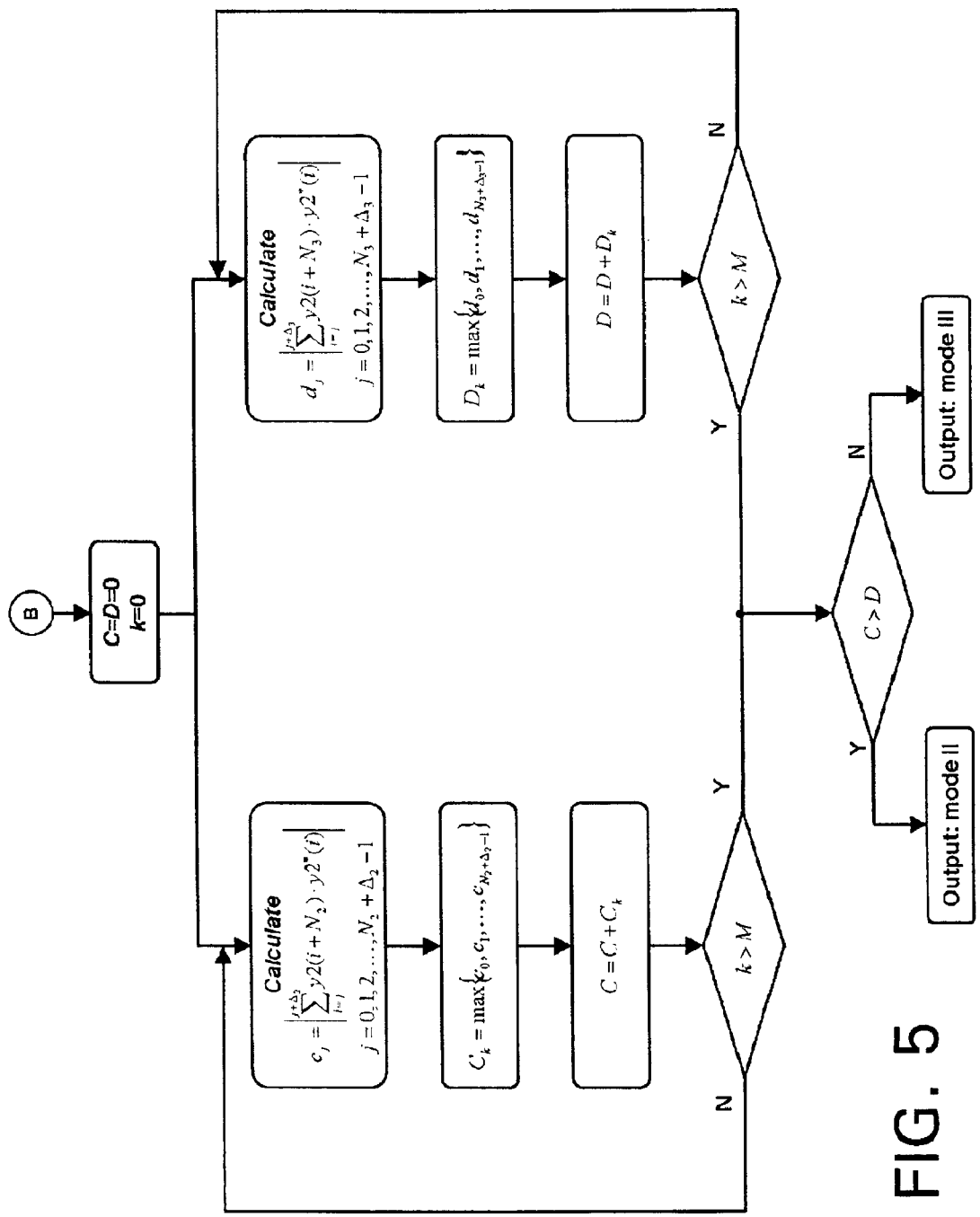
FIG. 5 shows another partial flowchart of the mode detection unit which determines the mode II or III using auto-correlation.

In FIG. 5, the auto-correlations in the modes II and III are computed starting from the rising edge of the frame envelope signal s'(n), which indicates roughly the starting time of the first OFDM symbol in a transmission frame. The correlation function in the mode II is $$c_j = \left|\sum_{i=j}^{j+\Delta_2} y2(i+N_2) \cdot y2^*(i)\right|, \quad (1)$$

where $N_2$=512 and $\Delta_2$=126. The correlation function in the mode III is $$d_j = \left|\sum_{i=j}^{j+\Delta_3} y2(i+N_3) \cdot y2^*(i)\right|, \quad (2)$$

where $N_3$=256 and $\Delta_3$=63. Let $C_k$ and $D_k$ be the maxima of the sequences $\{c_0,c_1,\ldots,c_{N_2+\Delta_2}{}^{-1}\}$ and $\{d_0,d_1,\ldots,d_{N_3+\Delta_3-1}\}$, respectively. Then, $C_k$ and $D_k$ are the auto-correlations of y2(*n*) computed based upon the modes II and III parameters, respectively. In order to avoid the false detections when the S/N ratio is too low, the auto-correlations, $C_k$ and $D_k$, for successive N symbols can be accumulated, respectively; that is, $$C = \sum_{k=0}^{N-1} C_k \quad \text{and} \quad D = \sum_{k=0}^{N-1} D_k.$$

The transmission mode is then detected as the mode II if C>D or the mode III if C<D. According to the statistics, a larger N value gives a smaller probability of making false detections.

Figure 10:
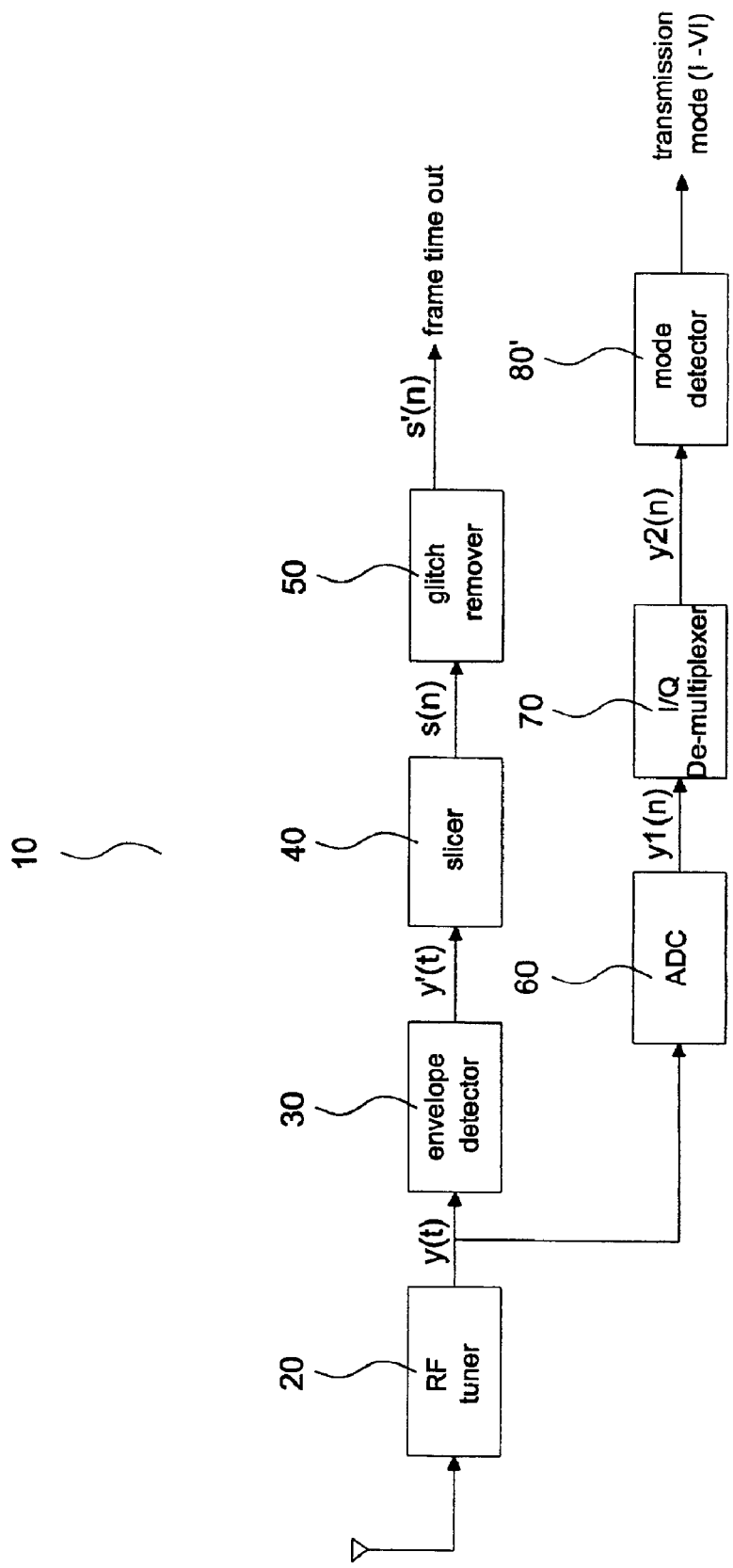
FIG. 10 shows a system block diagram of another embodiment of the disclosed transmission mode detector.
Figure 11:
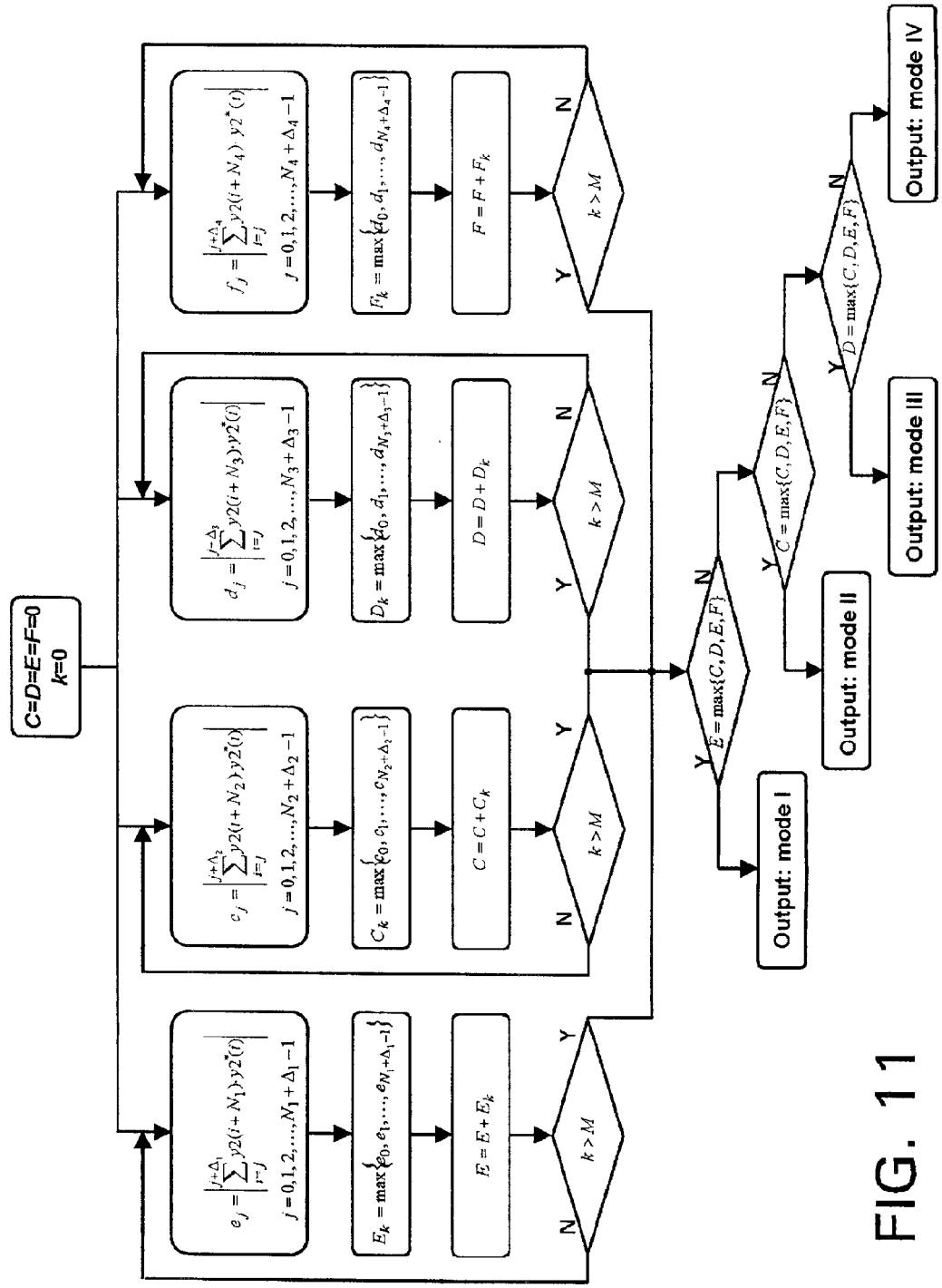
FIG. 11 illustrates the flow chart of the mode detector shown in the FIG. 10.

FIG. 10 illustrates another embodiment of the transmission mode detector. The transmission mode can be directly detected by the mode detector 80'. The mode detector 80' accumulates auto-correlations for successive N OFDM symbols for each transmission mode. As shown in FIG. 11, the auto-correlations from mode I to IV are all computed respectively. The detected mode is the one with the largest accumulated auto-correlation. Note that, from ETS 300 401, $N_1=2048$, $\Delta_1=504$, $N_2=512$, $\Delta_2=126$, $N_3=256$, $\Delta_3=63$, $N_4=1024$ and $\Delta_4=252$.

In conclusion, the disclosed transmission mode detector first uses an envelope detector to filter out the IF signal generated by the RF tuner and generates a rough envelope waveform. Then the glitches in the rough envelope waveform are smoothed out by the glitch remover so as to obtain a glitch-free and correct envelope signal. The transmission mode is finally detected directly according to the transmission frame duration of the envelope signal. The mode II and the mode III are further distinguished by employing the auto-correlation method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission mode detector for digital receivers to detect a transmission mode of transmission frames, comprising:

a RF tuner for receiving a RF signal and generating an IF (Intermediate Frequency) signal;

an envelope detector for filtering the IF signal and generating a rough envelope waveform;

a slicer for quantizing the rough envelope waveform into a binary signal with high and low potentials;

a glitch remover for removing glitches in the binary signal and generating an envelope signal;

an A/D (Analogue-to-Digital) converter for sampling and digitizing the IF signal and generating a digital signal;

an I/Q (In-phase/Quadrature) De-multiplexer for extracting an in-phase and quadrature signals in OFDM (Orthogonal Frequency Division Multiplex) symbols from the digital signal; and a mode detection unit for detecting the transmission mode according to a time period of the envelope signal and an auto-correlation of the OFDM symbols.

2. The transmission mode detector of claim 1, wherein the envelope detector includes:

a diode having a positive terminal for receiving the IF signal; and a resister-capacitor (RC) network having one terminal connecting to the negative terminal of the diode and the other terminal grounded.

3. The transmission mode detector of claim 2, wherein the slicer is a comparator having a positive terminal connecting to a negative terminal of the diode and a negative terminal connecting to a reference voltage for generating the rough envelope waveform.

4. The transmission mode detector of claim 1, wherein the mode detection unit computes the time period of the envelope waveform and the transmission mode is determined to be a mode II or III if the time period is 24 ms, a mode IV if the time period is 48 ms, and a mode I if the time period is 96 ms.

5. The transmission mode detector of claim 1, wherein a correlation function $c_j$ in the mode II is $$c_j = \left| \sum_{i=j}^{j+\Delta_2} y2(i+N_2) \cdot y2^*(i) \right|,$$

where $N_2=512$ and $\Delta_2=126$; a correlation function $d_j$ in the mode III is $$d_j = \left| \sum_{i=j}^{j+\Delta_3} y2(i+N_3) \cdot y2^*(i) \right|,$$

where $N_3=256$ and $\Delta_3=63$; and maximum auto-correlations $C_k$ and $D_k$ of sequences $\{c_0, c_1, \ldots, c_{N_2+\Delta_2-1}\}$ and $\{d_0, d_1, \ldots, d_{N_3+\Delta-1}\}$, respectively, are the auto-correlations of the IF signal computed based upon the modes II and III, respectively, and y2 is the in-phase and quadrature signal.

6. The transmission mode detector of claim 5, wherein the auto-correlations, $C_k$ and $D_k$, for successive N symbols are accumulated, respectively, to avoid false detections when a signal-to-noise ratio of the IF signal is smaller than a threshold; that is, $$C = \sum_{k=0}^{N-1} C_k \text{ and } D = \sum_{k=0}^{N-1} D_k;$$

and, therefore, the transmission mode is the mode II if C>D and the mode III if C<D.

7. The transmission mode detector of claim 6, wherein the transmission mode detector uses the auto-correlations of the OFDM symbols under different modes (I, II, III, and IV) to detect the transmission mode.

8. The transmission mode detector of claim 5, wherein the transmission mode detector uses the auto-correlations of the OFDM symbols under different modes (I, II, III, and IV) to detect the transmission mode.

* * * * *